ASYNCHRONOUS SELF CONTROLLED SHIFT REGISTER

Filed Sept. 6, 1962

4 Sheets-Sheet 1

INVENTOR
GEORGE COGAR

BY David Leach

ATTORNEY

Jan. 19, 1965 G. COGAR 3,166,715
ASYNCHRONOUS SELF CONTROLLED SHIFT REGISTER
Filed Sept. 6, 1962
4 Sheets-Sheet 2
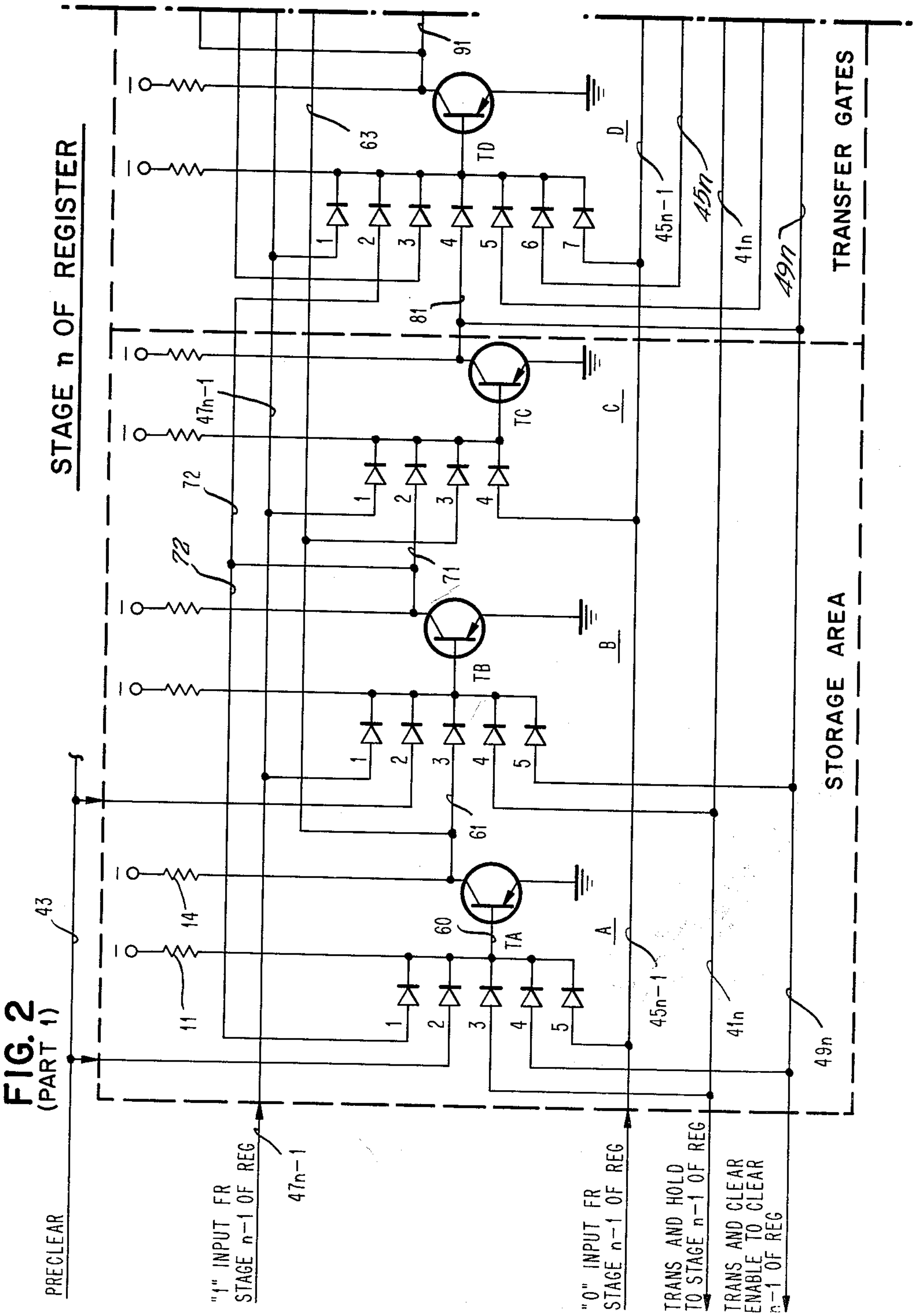
FIG. 2 (PART 1)

ASYNCHRONOUS SELF CONTROLLED SHIFT REGISTER

Filed Sept. 6, 1962 4 Sheets-Sheet 3

| BIT STORED | A | B | C |
|---|---|---|---|
| 1 | + | − | − |
| 0 | − | + | − |
| EMPTY | − | − | + |

FIG. 2 (PART 2)

TRANSFER CONTROL STAGE 3,166,715

ASYNCHRONOUS SELF CONTROLLED SHIFT REGISTER

George Cogar, Norwalk, Conn., assignor to Sperry Rand Corporation, New York, N.Y., a corporation of Delaware Filed Sept. 6, 1962, Ser. No. 221,706
14 Claims. (Cl. 328—37)

Figure 1:
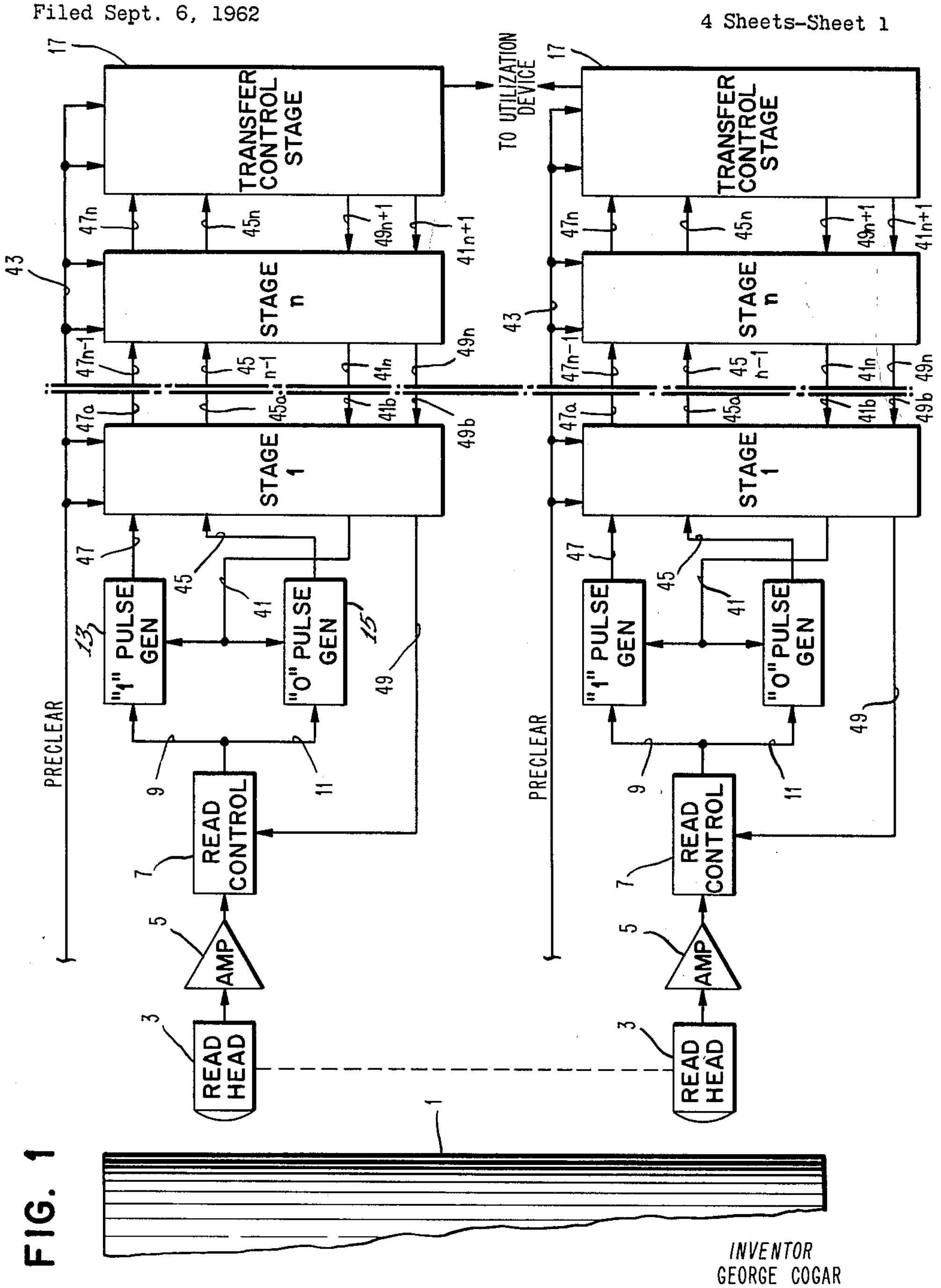

This invention relates to a system for receiving, storing, and reading out information and more particularly to a system for receiving, storing and reading out stored information which is capable of operating completely independent of any timing or clock source.

With the wide acceptance and use of electronic computing devices and data processing systems, faster and faster computing devices must be devised to meet the requirements of the ever increasing problem complexity and the problem of reduction and handling of large masses of information. Heretofore, increases in speed of overall operation have come from increases in the speed of operation of the relative parts and components of the data processing system or computer. For example, by increasing the speed of operation of the arithmetic component of the computing system, it is possible to increase the overall speed of such a system. However, certain limitations upon the speed of operation which such devices may attain are inherent in a particular manner of operation which most present computers and data processing systems employ. The procedure employed is that of synchronous operation, that is, the computer operates on a distinct timed cycle wherein each particular bit of information and each group of information occupies a well defined time period. The machine is thus limited in its operation to an inflexible repetitive time cycle equal to some multiple of the originally chosen word length or vice versa. Once the particular clock sequence and frequency are chosen, all operations within the computer calling for transfer, arithmetic operation and otherwise processing of the data is controlled by the timing selected. Provisions to allow for variance of the timing cycles involve complex equipment and programming techniques. Further, since these time intervals are pre-set and pre-assigned, they must be arranged to provide for the worst possible conditions which may occur due to individual operations within the machine. Thus, because certain elements within the machine are slow to react, that is, they take a long time to settle down to a stable operating condition, the time period provided must be sufficiently long to allow these slower elements to react. However, during this longer period many of the remaining elements within the computer are already settled to a reliable operating condition long before the longer operating component is ready to produce error-free information. Further in synchronous operation, each step of the transfer of information from one particular component to the next is controlled by individual clock pulsing. Therefore, if each stage is to be timed according to the worst possible condition which might occur within the computer, then the stages of unnecessary delay are compounded one upon another, thus producing a time sequence which is far slower than the time required to operate most of the components within the machine. Consider, the time spent in certain arithmetic operations—for example, the time required to propagate a carry from the lowest order to the highest order. Though this type of carry may rarely occur, sufficient time must be allowed for the possibility of this particular carry, to prevent its loss and thereby causing an incorrect result, which would be produced if account for carry were not made. Thus, it can be seen that with machines of the synchronous type, large portions of the timing cycle are wasted to provide for conditions which, although infrequent in their occurrence, must nonetheless be considered, if error-free information is to be obtained. Hence these systems may not be flexible enough to enable them to meet the needs of the problem presented for solution.

One solution to the foregoing problem, which would permit the more effective utilization of the time available for computation and permit more flexible use of time, would be the use of an asynchronous type of computing and data processing device. The asynchronous device as contrasted with the synchronous device mentioned above does not require a clock or timing pulse for its operation. Instead the asynchronous device determines each individual operation and the time at which they are to begin dependent upon the arrival of all the information necessary for operation at a particular stage. Stated another way, an asynchronous machine depends for its operation upon all necessary inputs being available to a particular stage before that stage will operate. It is generally a level type of machine rather than a pulse type of machine; that means that the signals which are made available in the various stages of the device are as voltage levels rather than short voltage pulses as is frequently found in synchronous types of computing devices. In this manner the inputs necessary for the operation of a particular stage are available sufficiently long to permit all of the necessary inputs to arrive and be present for operation. Consequently, individual stages of the computer may act and operate as soon as the data required for that particular stage has arrived without the additional requirement that it further wait for the arrival of a particular clock pulse which may occur long after the arrival of all necessary input pulses. By a system of this sort, the fastest time of operation as well as the slowest time of operation may be handled with equal ease without forcing the fastest time of operation condition to wait for a time pulse based upon the slowest time of operation possible. Word lengths and word formats may be varied because of the independence of the information from the rigid clock, thus permitting a more flexible manner of operation.

Briefly stated, the embodiment of the invention described consists of a device for reading information from a record surface and transferring it as it is available to an asynchronous shift register. Said shift register then advances the data received to its output stage at a rate determined by the register itself. The information may then be read from the shift register to any further device in a serial or parallel fashion. The device, because of its totally asynchronous operation, is able to handle information at a variety of recording densities; at a variety of speeds of operation of the record surface; and completely independent of the number of bits of information which are recorded in a particular data word. The speed of the operation of the device is limited solely by the speed at which the individual components may react to input information and other control levels. No form of clock pulse or other timing pulse is necessary for the operation of the device.

It is therefore an object of this invention to provide an asynchronous device for reading data from a record media.

It is a further object of this invention to provide a device for reading recorded information including an asynchronous shift register.

It is a further object of this invention to provide a device capable of receiving, registering, storing and transferring information employing asynchronous techniques.

It is yet another object of this invention to provide an asynchronous shift register capable of receiving, registering, storing, and transferring information independent of an external clock or timing signal.

It is a further object of this invention to provide an asynchronous shift register capable of receiving, registering, storing, and transferring information controlled by signals generated wholly within said shift register.

It is still a further object of this invention to provide an information reading system employing a plurality of asynchronous shift registers, one for each channel of information present on a recorded record, which will receive, register, and store information as available but will transfer information out of said registers only when each has received information from its respective channel.

It is still another object of this invention to provide a device capable of handling information without the necessity of providing a fixed or rigid clock or timing pulse arrangement.

Other objects and features of the invention will be pointed out in the following description and claims and illustrated in the accompanying drawings, which disclose, by way of example, the principle of the invention and the best mode which has been contemplated for carrying it out.

Figure 2A:
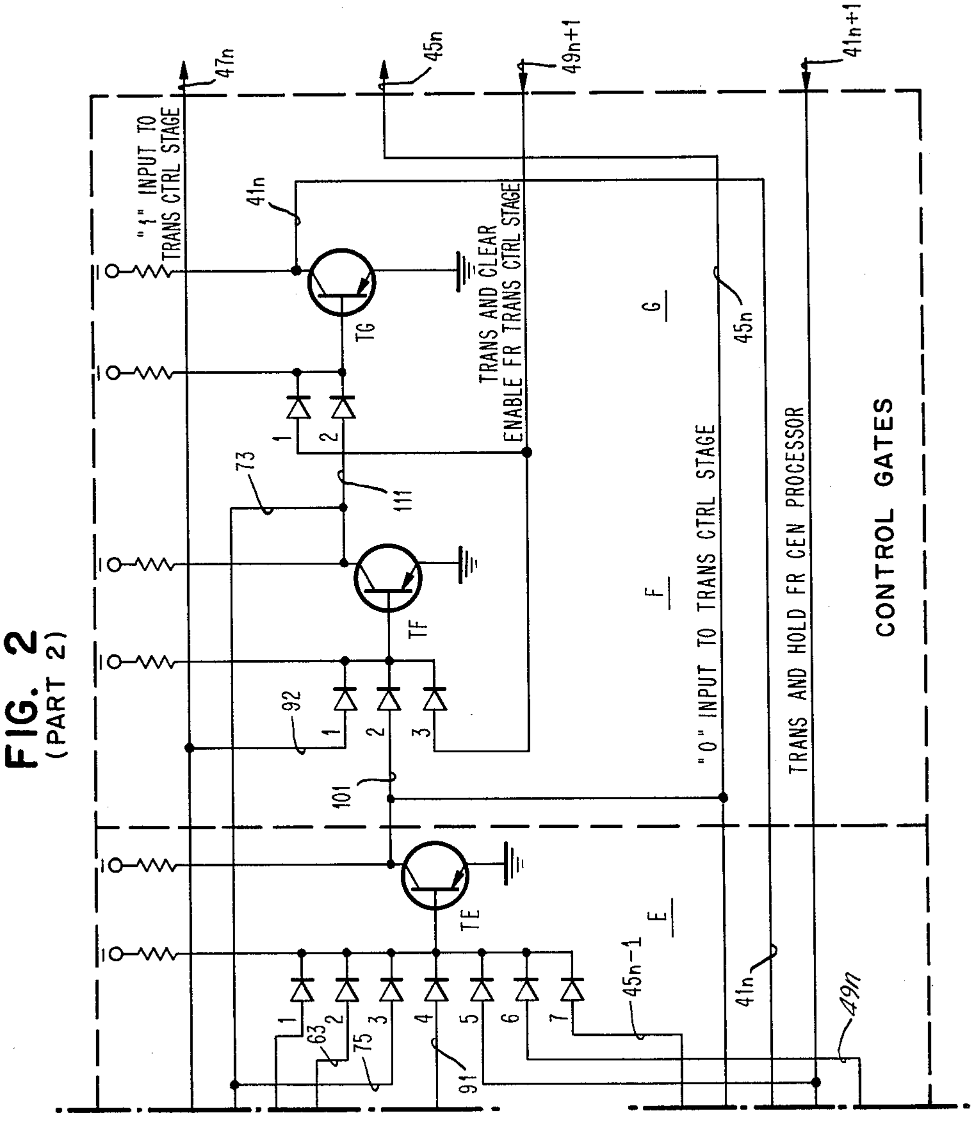
Figure 3:
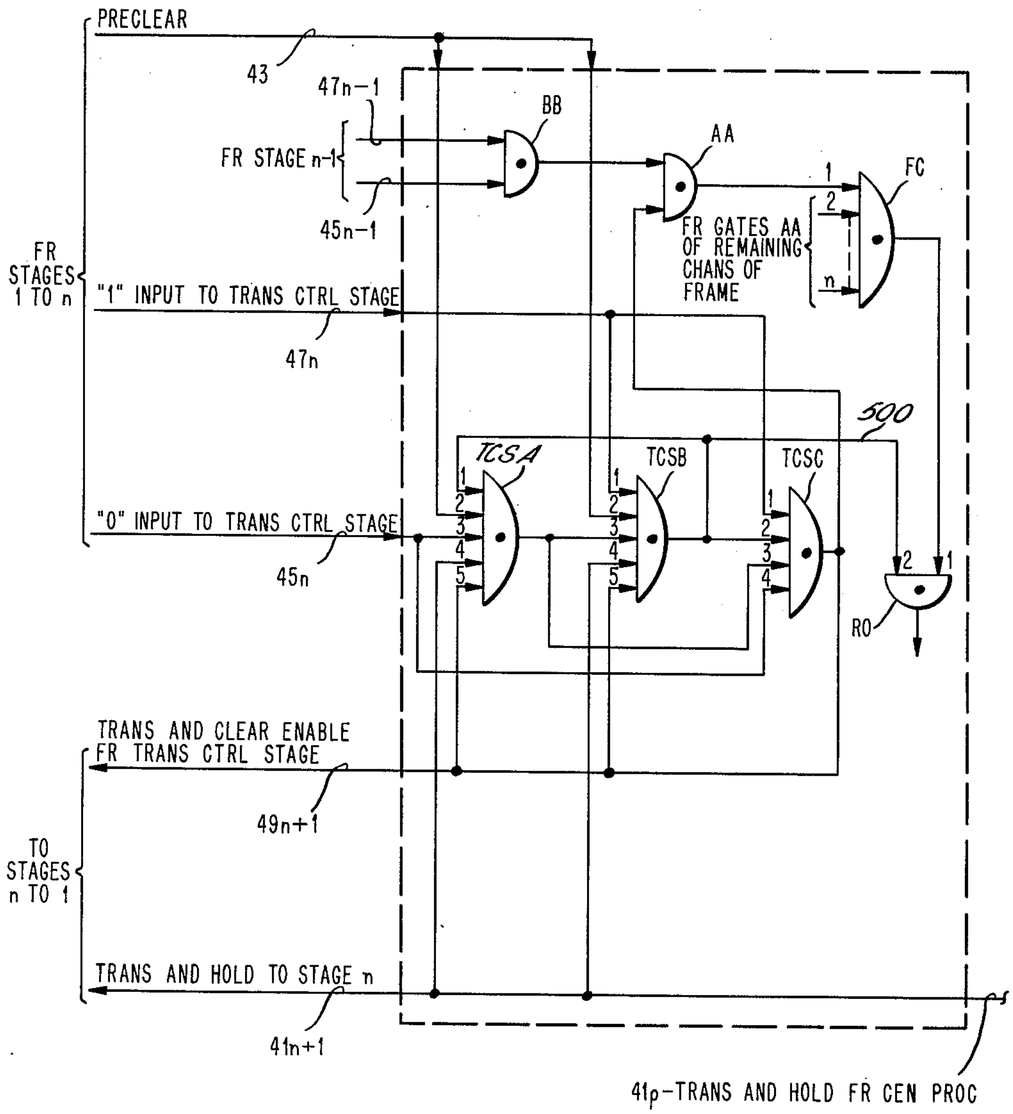

In the drawings:

FIG. 1 illustrates a device for reading information from a multi channel record media, employing a plurality of asynchronous shift registers constructed in accordance with the concepts of the invention;

FIG. 2, composed of Parts 1 and 2, illustrates, in detail, the construction of such an asynchronous shift register;

FIG. 2*a* illustrates the convention employed for storing information within the asynchronous shift register;

FIG. 3 illustrates the details of the Transfer Control Stage shown in FIG. 1.

Similar elements are given similar reference characters in each of the drawings.

Referring to FIG. 1, there is shown a device for reading, registering, storing, and transferring information in the asynchronous manner of operation. The device is arranged to read data recorded upon a media, moved with relation to said units. The data is arranged upon said media in a parallel fashion, that is the data components or bits of single data digits are presented to the units simultaneously, whereas the successive data digits are presented in a serial fashion. It should be noted that the number of bits in a data digit will depend upon the particular code employed and that the number of reading and transferring units employed will be equivalent to the number of bits per digit. The bits which are used to represent a data digit are referred to as a frame and as stated above will be read simultaneously. Thus, if there are nine bits per digit, there will be nine bits per frame and nine reading and transferring units.

In the illustrated embodiment, information is read from a record surface identified as 1 which is moved at a relatively constant speed with respect to the reading devices by means not shown. As the record surface is moved, the information contained upon it is read by a plurality of read heads 3 which may be of any appropriate type for the particular surface employed. The read head may be photoelectric if a punched tape is read whereas a magnetic pick-up may be used for a magnetic record. The information so read is transferred to a read amplifier 5 where it is amplified to provide sufficient levels for the remainder of the circuitry. It should be noted that the device of FIG. 1 is described below with reference to a single channel, since all channels are similar. The output of the read amplifier 5 is fed to read control circuit 7. This circuit is capable of distinguishing between signals indicative of a "one" value and a "zero" value read from record 1. Upon detecting a one value, a signal will be provided on the line 9. The detection of a zero value will result in the application of a signal on the line

11. The generation of signals by the control 7 is further controlled by a Transfer and Clear Enable Signal from register stage 1 on line 49 as will be described below. The read control 7 may include a differential amplifier which will produce distinct outputs for the respective one and zero signals received from the read head. Further control 7 may include gates responsive to the output of the differential amplifier and under the control of the signal on line 49 to apply its outputs to the respective lines 9 and 11. The line 9 is connected to a ones pulse generator 13, which generator will produce a negative or low signal except when actuated by a signal on line 9. However, upon the receipt of a signal on line 9, the generator will put out a long duration positive or high level signal on the line 47. It should be noted that the device disclosed operates on signals of distinct levels maintained for relatively long durations and not upon short interval pulses. It should further be noted that the terms, positive, high, negative and low are relative terms and are employed to establish relationships among the signal levels in the device without reference to other conventions outside of the device. The particular signals levels employed herein are a zero voltage level for a positive or high signal and a −3 volt level for a negative or low signal.

The line 11 is connected to a zero pulse generator 15, which generator will produce negative or low signal except when actuated by a signal on line 11. When a signal is applied via the line 11, generator 15 will produce a long duration positive or high signal on the line 45. The generators 13 and 15 may include a form of differentiating network which causes a long duration signal to be produced for each change in input signal level. The generators 13 and 15 are controlled in their operation by a signal on the line 41. This signal is referred to as the Transfer and Hold signal and is applied from stage 1 of the asynchronous shift register in a manner to be described. The outputs of the generators 13 and 15 are impressed upon the input lines 47 and 45 respectively, which connect the generators to stage 1 of the asynchronous shift register.

The asynchronous shift register is composed of a plurality or *n* number of stages such as those shown in the figure. Although three such stages appear in the figure, it should be understood that this representation is merely for illustrative purposes and that as many stages as desired may be included within the register without departing from inventive concept disclosed herein. As is evident from the figure each stage may receive an input from the preceding stage over the one input line, line 47 or the zero input line 45. Further each stage supplies its preceding stage with a transfer and clear enable signal on line 49 as well as a transfer and hold signal on line 41. In addition a preclear signal is provided to all stages of the shift register over the line 43. The functions and operations of the shift register will be described below with reference to FIGURE 2.

The output of the final or *n* stage of the asynchronous register is transmitted to a Transfer Control Stage 17 which controls the read out of information from the register to the particular utilization device (not shown) in which the information is required. As will be described below with reference to FIGURE 3, the transfer control stage may be employed to control data flow within the register itself and to correct for skew which may have been present in the data as read by the plurality of read heads 3.

Referring now to FIGURE 2, the details of the "*n*" order of the asynchronous shift register of FIGURE 1 are shown. The stage contains a plurality of negative input signal "And-inverter" gates divided into three specific functional groups, the first of which consists of the gates A, B and C which comprise the storage area of the stage. The second group contains the gates D and E and comprises the transfer portion of the stage. The third and final group of gates is the control group which consists of gates F and G. The negative input "And-inverter" gate produces a positive or high signal at its output if all of its inputs are present and negative, whereas a negative or low signal is produced at its output if any of its inputs are positive or high.

More specifically the operation of these "And-inverter" circuits may be understood by considering the two input "and-inverter" gate G of the control section of the asynchronous shift register. As can be seen from FIGURE 2 the inputs are introduced to the anodes of two diodes, the cathodes of which are connected to a common negative bias source through a resistor. The output, taken from the cathodes, is connected to the base of a PNP transistor TG which is arranged in a grounded-emitter configuration with the gate output being taken from the collector. The collector of transistor TG is also biased negatively through a resistor. If negative pulses are applied to both of the anodes 1 and 2 of gate G, then no current is permitted to flow within the diode arrangement and the voltage presented to the base of the transistor TG is, neglecting any loss due to the bias resistor of the cathodes of the diodes, the negative value of the bias supply. If the value of the negative bias supplied to the collector of the transistor TG is smaller, that is positive with respect to the value of the negative signal now applied to the base of the transistor TG, the transistor will be permitted to conduct thereby providing an output level which is the ground value of the emitter. Assuming that the signals are represented as a zero voltage for a positive signal and a −3 for a negative signal, the production of a zero or ground level at the output of the collector TG is equivalent to the production of a one signal, thus for the introduction of two negative inputs there is produced a single positive output. In a similar fashion, the introduction of a single negative and a single positive to the respective inputs 1 and 2 of the gate will produce the following effects: the positive signal on the anode of the diode will cause a current to flow in that particular diode causing the junction point of the two diode cathodes to raise its level to that of ground or the positive value. This positive value will then be applied to the base of the transistor TG preventing it from conducting. This is due to the fact that the base of the PNP transistor is now positive with respect to the collector rather than negative as required for conduction. With the transistor prevented from conducting, the output signal produced is due to the negative bias voltage on the collector of the transistor TG. Thus for a signal which has one input of positive and one of negative, a negative signal will be produced. In a similar fashion if both of the input signals to the inputs 1 and 2 of the gate G were positive, current would be permitted to flow through the respective diodes producing a value at the junction with the base TG which was also positive. Hence the transistor would not conduct, resulting in the production of a negative output voltage at the collector.

For proper operation of an asynchronous device it is necessary that the device at all times be able to determine what type of information it is storing, for example, it must be able to determine whether the stages are storing a one or a zero or whether they are in fact empty. Thus for storage within the asynchronous register itself information must be converted into a form which will correctly indicate the content of the stage. Referring to FIGURE 2*a* there is shown a coding arrangement employing a three unit code to indicate the required three conditions. Should gate A produce a positive output value while the gates B and C produce negative outputs it would be considered that a one was stored within that stage. Similarly, if gate A produced a negative output, B a positive and C a negative output, then the stage would be considered to store a zero. However, if gates A and B both produce negative output levels while gate C produced a positive output level the stage would be considered to be empty. Thus the three gates A, B and C when considered together will produce outputs indicative of the value stored therein.

Further, the use, in an asynchronous device, of a three level signal, that is, a definitive signal for the empty condition as well as the storage of "one" and "zero" conditions prevents the generation of spurious signals known as spikes. For example, if a particular gate has a single actuating input and a single inhibiting input, it will produce an output if the actuating input is present and the inhibiting input is absent. However, because the application of signals in the asynchronous device is not clocked or otherwise regulated as to time of application the actuating input may arrive before the inhibiting input despite the particular gating function requiring both. Thus an output signal will be produced at the gate output during the period the actuating signal alone is applied. This signal or spike if not otherwise eliminated can produce erroneous operation of the device. The three level code, as described above, provides for definitive signals on all the storage gate output lines regardless of the state of the storage device, thus preventing the transfer gates to be described from operating except upon the occurrence of the proper input conditions for each of the gates.

Referring again to FIGURE 2, it can be seen that gate A is constructed of five diodes designated 1, 2, 3, 4 and 5 arranged with their cathodes connected to a resistor and negative bias source. The following notation will be used throughout the description to simplify the drawings and description. The diodes for a particular gate will have the reference letter of the gate prefixed to the diode number to permit the diode to be readily identified. Thus for example, diode 1 of the gate A will be referred to as diode A1. The anodes are arranged to receive input levels according to the input information and control which is necessary for proper operation. The output from the commoned cathodes of diodes A1 to A5 are connected by a lead 60 to the base of a PNP transistor TA arranged in a grounded emitter configuration. The collector of the transistor is connected through a suitable resistor to a negative bias supply. The value of the bias supply to the collector of the transistor is positive with respect to the value of the bias supply for the cathodes of the various diodes of the gate A. A positive pre-clear signal supplied on the line 43 is connected to the anode of the diode A2. The "zero" input line 45*n*−1 from the "zero" output of stage *n*−1 is connected to the anode of the diode A5. The anode of diode A4 receives a signal from the output of the gate C along line 49*n*, while the input to the anode of diode A3 is derived from the output of the gate G (transistor TG) along the line 41*n*. Finally, the input to the anode of diode A1 is connected to the output of the gate B (transistor TB) along line 72.

The B gate of the storage area is of similar construction to that described with reference to the A gate and its inputs are as follows: the input to the anode of the diode B1 is provided by the "one" output from the preceding stage *n*−1; the input to diode B2 is the pre-clear signal along the line 43; the input to diode B3 is supplied by the output along line 61 of the transistor TA of the gate A of the storage area; the input to diode B4 is provided by the transfer and hold signal over the line **41*n*** from the gate G, the fifth input to gate B at the diode B5 is provided over the line 49*n* from the output of gate C.

The gate C of the storage area is composed of four diodes with suitable bias supply and an output transistor arrangement as disclosed with reference to the other gates A and B of the storage area. The inputs to its diodes are as follows: the input to diode C1 is provided over line 47*n*−1 from the "one" output terminal of stage *n*−1; the input to diode C2 is provided by the output of the gate B over line 71; the input to the diode C3 is provided by the output of the gate A via line 63 and the final input to the diode C4 is provided over the line 45*n*−1 from the "zero" output terminal of stage *n*−1.

The transfer gates D and E are similar in construction to those described with reference to storage area gates except that they include seven diodes rather than the smaller number found in the other gates.

The D transfer gate of stage $n$ serves to transmit a signal indicative of the storage of a "one" in stage $n$, so as to provide a "one" input signal to the next higher order stage $n+1$. This gate D will be actuated only after the gates of the storage section have settled to indicate the value now stored therein and upon receipt of signals from the stage $n+1$ indicating it now is empty and may receive the contents of the stage $n$. Upon the concurrence of these two conditions, the gate D will furnish a high signal on the line 47$n$ to permit the transfer of the value "one" to the transfer control stage. In a similar manner the E transfer gate of stage $n$ serves to transmit a signal indicative of the storage of a "zero" in stage $n$, so as to provide a "zero" input signal to the transfer control stage. The same coincident conditions, as set out above with respect to the operation of the D transfer gate, must also be present in order for gate E to furnish a high signal on the line 45$n$ to cause the transfer of a "zero" to the transfer control stage.

The inputs to the transfer gate D is as follows: the input to diode D1 is provided by the one output from the stage $n-1$ via the line 47$n-1$; the input to diode D2 is provided by the output of the gate B of the storage area via line 72, the input to diode D3 is provided by the output of the gate F over line 73; the input to diode D4 is provided by the output of the gate C via line 81, the diode D5 has applied to it the transfer and hold signal on the line 41$n+1$ from the central processor (the function of this signal will be explained below); the input to diode D6 is provided by the output of the gate E via line 45$n$; and finally the input to diode D7 is provided over the line 45$n-1$ from the "zero" output terminal of stage $n-1$.

The transfer gate E has the following inputs: the input to diode E1 is provided by the "one" output from stage $n-1$ via the line 47$n-1$; the input to diode E2 is the output of the gate A along line 63; the input to diode E3 is the output of the gate F via line 75, the input to diode E4 is the output of gate D via line 91; the input to diode E5 is the transfer and hold signal from the transfer control stage along line 41$n+1$; the input to diode E6 is the output of the gate C of the storage area via line 49$n$, and the input to diode E7 is the "zero" input signal from stage $n-1$ along the line 45$n-1$.

The final two gates are the control gates of the device and are constructed in a fashion similar to those described with reference to the storage and transfer gates.

The F control gate is responsible for applying enabling signals to the transfer gates D and E to permit them to transfer the value stored in stage $n$ if the storage gates of the transfer control stage are empty. This is determined by the sensing of the output of gate C of stage $n+1$. The G control gate is responsible for resetting the stage $n$ to its empty condition after stage $n$ has transferred its contents to the transfer control stage preparatory to accepting further data from stage $n-1$. The positive output of gate G (causing the resetting of gates A and B of stage $n$) will result only if stage $n$ is transmitting a "one" or "zero" value to the transfer control stage and that stage is changing its condition so that it no longer stores an empty indication. Thus the positive output of gate G only exists when the stage $n$ is being cleared.

Gate F consists of three diodes the first of which receives the output of gate D along line 92; the second of which receives the output of gate E via line 101; and the third diode F3 has applied to it the transfer and clear enable signal along line 49$n+1$ from the transfer control stage. The manner of generation and the function of this signal will be described below. The final gate G is constructed of two diodes, diode G1 receives a transfer and clear enable signal from the transfer control stage along line 49$n+1$ and the second diode G2 receives a signal from the output of stage F via line 111. The output of the gate G constitutes the transfer and hold signal which will be applied to the next lower order stage $n-1$ via the line 41$n$.

From the foregoing description it can be seen from the description of FIGURE 2 that the stages to the right will provide certain control signals for stages to its left and receive certain information signals from the stages to its left. Information may be transferred along the length of the device from left to right, that is from lower order stages to higher order stages in a manner completely determined by the contents of the register itself and without reference to external timing or control pulses. The signal produced on the line 41$n+1$ as a transfer and hold signal for stage $n$ is generated by the central processor and is applied to both the transfer control stage via line 41$p$ and to the stage $n$ via line 41$n+1$. The transfer and hold signal to the $n-1$ stage is merely the output of the gate G of the $n$ stage. Similarly, the transfer and clear enable to stage $n-1$ is merely the output of the gate C of the stage $n$ which produces a signal on the line 49$n$ similar to the signal received on the line 49$n+1$ from the transfer control stage of the device. This signal on the line 49$n+1$ controls the gates F and G of the stage $n$. The zero output signal to the transfer control stage conducted by the line 45$n$, is merely the output of the gate E and provides a zero input signal to the transfer control stage. The one output of stage $n$ on the line 47$n$ is seen to be the output of the gate D and serves to provide a one input to the transfer control stage.

The manner of operation of the asynchronous shift register stage of FIGURE 2 will now be set forth. Prior to the receipt of information by the shift register a pre-clear signal is applied to it via line 43 by the computer command system or a switch (not shown) to clear any value presently being stored and place all the gates in their initial conditions. The pre-clear signal is a positive valued signal applied for a sufficiently long duration to assure the desired clearing has taken place. At the end of the pre-clear period, the pre-clear line 43 is returned to a negative value level, which level persists during the entire operation of the register. The pre-clear signal establishes the following initial conditions in the gates A, B and C. The positive input to diode A2 causes the output of gate A to become negative. It will be recalled that the gates A, B and C as well as D, E, F, and G are negative input "And-inverter" gates which produce negative outputs if any input is positive and positive outputs if all inputs are present and negative. The application of the positive pre-clear signal to diode B2 similarly causes the output of gate B to be negative. The output of gate C will be positive due to the presence of negative signals on all of its inputs. This is so because the zero input line 45$n-1$ connected to diode C4, and the one input line 47$n-1$ connected to diode C1 are maintained at negative levels except when a digit is being transferred which is not the case here, the register being cleared at this time. Further the outputs of gates A and B connected to diodes C3 and C2, respectively, are also negative due to the pre-clear signal as set forth above. Thus all inputs to gate C are present and negative causing its output to be positive. This output condition of the storage area, namely gates A and B negative and gate C positive indicates that the stage is empty in conformance with the code depicted in FIGURE 2$a$.

Upon the application of the first input information from stage $n-1$, assuming this first digit to be a zero, the inputs to the diodes are as follows. The input to diode A1 will be negative as a result of the output of the gate B along the line 72. The input to diode A2 will also be negative due to the presence of a negative signal at all times on the pre-clear line 43 except during those times that a positive pre-clear pulse is applied. The input to diode A3 is negative due to the output along line 41n of the gate G, which signal is always negative except when the register is being cleared. The input to diode A4 from gate C is positive indicative of the fact that the register was empty prior to this time. Further, the input to diode A5 of the gate A is also positive due to the application of the zero input from the stage $n-1$ on the line $45n-1$. This signal, in the absence of a signal from the gate C would also cause the output of the gate A to become negative.

The originally negative output of the gate B, which is also indicative of the fact that the register was originally empty, is made to change to a positive value to indicate that a zero is being stored in the storage area of this particular stage. This is accomplished in the following manner: The input to diode B1 remains negative due to the absence of a one input signal, the input to diode B2 is negative because of the usual pre-clear condition, the output of the gate A causes the input of the diode B3 to have impressed upon it a negative signal; the diode B4 receives a negative signal as the output from the gate G along the line 41n, which is negative during all times except clearing, and finally the input to diode B5 is a negative signal from the output of the gate C along the line 49n. As a consequence of all of its inputs being negative, the output of the gate B swings positive.

Finally, the output of the stage C must change from a positive value, which indicated that the register stage was empty, to a negative value required to indicate, along with the states of the outputs of the gates A and B, the fact that the device now stores a zero value. This change in output is accomplished as a result of its input signals in the following manner: diode C1 receives a negative signal due to the absence of a positive one input. The input to diode C2 is the positive output value which the stage B now produces. The input to diode C3 is derived from the output of the stage A which at this time is negative. Finally, a positive signal is impressed on the diode C4 as a result of the incoming zero signal represented by a positive value signal. Thus, with positive inputs to the gate, the output of the gate C swings negative. With the device having settled to its condition of storage of a zero value, it is now ready to aid in the transmittal of an additional set of information to it from the stage $n-1$ and to transmit its information to the storage area of the transfer control stage.

During the time of the input signals (at either the zero or one input lines) the gates D and E are prevented from passing any signals to the output lines of the stage because the positive signal representative of either the zero or one input (on their respective input lines) holds the outputs of these gates negative. It will be recalled that it is the positive signal of these gates which serves to transmit a one or zero value respectively.

Transmittal of stored information is accomplished by means of the transfer gates and control gates indicated respectively as gates D and E and F and G. Transfer gate D has a negative level impressed at diode D1 indicative of the fact that a one input is not present on the line $47n-1$, diode D2 receives a positive value signal from the output of the gate B; diode D3 receives a negative value signal from the output of the gate F based upon the assumption that the storage area of the transfed control stage is empty. In other words, in our original assumption, we assumed that the register had been completely cleared prior to the receipt of any information. Thus the positive output of gate TCSC of the transfer control stage to the immediate right would be indicative of the fact that storage area of the transfer control stage was empty. This positive signal from gate TCSC of the transfer control stage is applied to diode F3 of the gate F causing a negative output signal to be impressed on the output line of gate F and in turn diode D3 of gate D. Diode D4 receives the negative output signal of the gate C of stage $n$ while diode D5 receives a signal on the line $41n+1$ from the transfer and hold line of the transfer control stage. The signal on line $41n+1$ is supplied by the central processor, which signal is always negative except during the time the register is being cleared, this is not the case here. Hence, the input to diode D5 is negative at this time. Diode D6 receives a signal from the output of the transfer gate E which is negative due to the effect of the positive zero input signal to the diode E7 of the gate E, and the signal to the input of diode D7 of the gate D is positive due to the positive zero input signal on the line $45n-1$. The presence of the positive signals on the diodes D2 and D7 cause the output of the gate D to become negative, thus applying a negative signal to diode F1 of the gate F. The output of the gate D is also applied to diode E4 of the gate E which receives in addition a negative signal on the diode E1 as a result of the negative value on the one input line $47n-1$. Further, gate E receives a negative value on diode E2 due to the negative output of the gate A, and a negative value from the gate F. The output of gate F is negative due to the positive input to it from gate TCSB of the transfer control stage, which is in the empty condition. The remaining inputs to the diodes of gate E are as follows: a negative value is impressed on the diode E4; a negative value exists at diode E5 for the reason that the transfer control stage storage area is not being cleared and line $41n+1$ from the central processor remains negative; a negative value is impressed on the diode D6 due to the negative output of the gate C and finally a positive value is applied to the diode E7 due to the zero pulse being applied to line $45n-1$ as set forth above. The negative output signal from gate E is introduced to the diode F2 of the gate F along with a negative signal to the diode F1 produced by the output of the gate D. Despite these negative inputs, the output remains negative as a result of the application of a positive signal from the gate TCSC of the storage area of the transfer control stage to the diode F3 of the gate. Further, the positive input from gate TCSC impressed on diode G1 is sufficient to cause the output of the gate G to be negative despite the application of a negative signal on diode G2 due to the output of the gate F.

When the positive input signal on line $45n-1$, indicative of the transmitted zero value signal, falls off due to the stage $n-1$ returning to an empty condition (stage $n-1$ having completed the transfer to stage $n$ of its stored contents), the line $45n-1$ returns to a negative level condition. It should be recalled that a negative level exists at all times except during the transfer of a zero signal which is indicated by a positive level. Thus, the positive input to diode E7 is removed and a negative level substituted. In that all of the inputs to gate E are now negative a positive signal is produced on the line 45n to permit the transfer of the stored zero signal to the storage area of the transfer control stage. The application of the signal on the line 45n will cause the gates TCSA, TCSB and TCSC of the transfer control stage to take up their zero indicating conditions as shown in FIGURE 2a and described above. The output of gate TCSC in going from a positive output (which exists when the stage is empty) to a negative output (which exists when a zero or one is stored) places a negative level on the transfer and clear enable line $49n+1$ to the stage $n$. This signal is applied to diode F3 of stage $n$ but is ineffective to change the output of gate F due to the presence of the positive input to diode F2 from gate E. The negative output on line $49n+1$ is also applied to diode G1 of stage $n$ where it, in conjunction with the negative input to diode G2 from gate F, causes the output of gate G to go positive. The positive output of gate G is applied via line 41n to diodes A3 and B4 of stage $n$ causing the outputs of gates A and B to go negative. The negative output of gate B as well as the fact that the positive zero input has ceased to make all inputs to gate C negative causing its output to go positive. Thus, with the outputs of gates A and B negative and the output of gate C positive the stage empty condition is automatically restored, preparatory to the receipt of further input information and after stage $n$ has transmitted information to the transfer control stage. Further, the positive output of gate C, connected to diodes A5 and B5 insure that gates A and B continue to produce negative outputs regardless of any change in the signal on line $41n+1$. Also, the positive output of gate C to diode E6 changes the output of gate E to negative thus terminating the transfer of further information to the transfer control stage. The stage is now capable of receiving a new bit of information. Information may only be transferred into stage $n$ after stage $n$ completes the transfer of its stored information to the transfer control stage.

Thus it can be seen that if a bit of information is entered into stage 1, it will automatically transfer through each successive stage until it arrives at the last empty stage, and will so remain until the succeeding stage is emptied. Furthermore, it can be seen that information can be entered into such a register without regard to other conditions occurring within the register (providing that at least the first stage is empty), and correspondingly information can be read out of the final stage of the register without regard to conditions in any other stage of the register.

The output of the shift register on the lines $47n$ and $45n$, respectively, may be transferred further to various portions of the computer itself for use, by means of a transfer control stage which will now be discussed with reference to FIGURE 3. The transfer control stage is composed of a storage arrangement similar to that contained within the shift register itself and is composed of three gates TCSA, TCSB, and TCSC. These gates function in the manner similar to that described with reference to the shift register and with regard to FIGURE 2*a*, that is, when a one is stored a positive output will be produced by the gate TCSA whereas negative outputs will be produced by the gates TCSB and TCSC. Further, a zero will produce negative outputs at the gates TCSA and TCSC, while a positive output is produced by the gate TCSB. The input to gate TCSA consists of the following signal voltages: the output of the gate TCSB is introduced to terminal 1, terminal 2 is supplied by the clear pulse along the line 43, a zero input signal from the stage $n$, that is the last stage of the shift register proper, is connected to the third input terminal, the fourth terminal is supplied by transfer and hold pulse along the line $41p$ furnished by the central processing device and finally the input to terminal 5 is supplied by the output of the gate TCSC along line $49n+1$. The inputs to gate TCSB are as follows: input terminal 1 is supplied by the one output of the stage $n$ to the left of the transfer control stage along the line $47n$, input terminal 2 is supplied by the pre-clear pulse along line 43. The input terminal 3 is supplied by the output of the gate TCSA, the fourth input terminal is supplied via the transfer and hold line $41p$ from the central processing device and finally the fifth input terminal is supplied by the output of the gate TCSC. The gate TCSC has the following four inputs: input 1 is supplied by the one output signal along the line $47n$ from the $n$th stage of the asynchronous register, input 2 is supplied by the output of the gate TCSB, input 3 is supplied by the output of the gate TCSA whereas the input number 4 is supplied by the zero output signal of the $n$th stage along the line $45n$. As the information is passed from the final or the $n$th stage of the asynchronous register to the transfer control stage (FIG. 3), a storage pattern similar to that which formerly occupied the $n$th stage is set up in the gates TCSA, TCSB and TCSC of the transfer control stage, for final transferral to the central processing device or other utilization device (not shown).

The signal indicative of the storage of a one or a zero as read from the original input record surface are not however, transferred directly from the output of the gates TCSA, TCSB, and TCSC to the input of the utilization device but are rather controlled by a further set of gates to be described. An "and" gate RO, for each channel is employed to read out the bits of the separate frames of information as they are available from the shift register. The RO gate will also provide a format change for the one and zero signals stored in the register. Although the three unit code was helpful in the register itself, it must be altered to a form more readily usable by existing equipment. This is done by permitting gate RO to transmit an output signal to indicate one and provide no signal to indicate a zero, as will be described below. As will be recalled from the earlier explanation, a frame of information is considered to be one-bit position in each one of the channels which are being read. For example, if there are nine channels of data to be read, there is an occurrence of nine bits of information, that is, one or zero in each of the respective nine channels. Thus, for each frame of information in the example using nine channels, there will be nine parallel bits of information available.

The status of the storage section, that is the gates TCSA, TCSB and TCSC, of the transfer control stage is sensed by the readout gate RO via the line 500 which is connected to the number two input terminal of the gate RO. The use of a single line for identification of the contents of the various gates TCSA, TCSB and TCSC is evident from a consideration of the table of FIGURE 2*a*. By sensing the output of the gate TCSB it is possible to determine immediately whether or not the device is storing a one or a zero. For example, if the device is storing a one, then the output of the gate TCSB will be negative whereas if a zero is stored the output of the gate will be positive. The one input terminal of the readout gate RO is connected to a further gate FC which provides the control signals necessary to permit readout of the data stored in the gates TCSA, TCSB, and TSSC. The gate FC receives inputs from each of the respective channels being read, which constitute a particular frame. Only a single input to the gate FC, corresponding to the first channel, is illustrated but it should be understood that the arrangement shown for this input is duplicated for each of the respective channels which constitute the frame. The gate FC is a positive input "and" inverter which will provide a negative output if all inputs are present and positive. The input to each terminal of the gate FC is provided in the following manner: a signal is provided from the gate AA to an input terminal of the gate FC (for example terminal 1) each time the following conditions are satisfied, namely, that the storage section of the transfer control stage is filled, that is containing either a zero or a one value, this condition being indicated by sensing the output of the gate TCSC at the terminal 2 of the gate AA. It should be noted from FIGURE 2*a* that the output of gate C is always negative if a value is stored, whether it is a zero or a one. The second condition which the gate AA senses is the fact that a bit is not being transferred into stage $n$ which is indicated by a signal on its one terminal from a further gate BB. The gate BB is a negative input "and" gate which provides a negative output only if both inputs are present and negative. The inputs to the gate BB are determined by sensing the content of the lines $47n-1$ and $45n-1$ between the stages $n-1$ and $n$. Thus in the absence of a positive signal, on either of the lines $47n-1$ and $45n-1$ to the input of the stage $n$ it can be determined that no information is being transferred into the stage $n$ and thus no information will be transferred which could interfere with the information already set within the stage $n$ which is in turn to be transferred into the transfer control stage storage area. Thus with the presence of both negative inputs to the gate AA indicative of the fact no further information is being transferred into the stage $n$ (the output of gate BB) as well as the fact that the transfer control stage is now filled (the output of gate TCSC), a positive signal will be issued by the gate AA to the one input terminal of the gate FC. In a similar fashion, each of the remaining channels which compose the frame will similarly transfer signals to the respective terminals 2 through $n$ of the gate FC. When gate FC receives signals on all of its inputs, indicating all bits in the frame are now stored in the transfer control stage, it will issue a signal to the one terminals of the readout gates permitting them to pass on their stored values. As is obvious from the manner of operation of the device, no information may be read out from the various channels of the composite reading and storage device until bits are available on each of the channels which constitute a single frame. In this manner the device can well serve as a deskewing type of device. As well known in the art skewing may occur, for example, due to the unequal stretching of the tape across its width. As a result of this stretching of the tape, unequally along its width, it may be possible in an extreme case for the bits of one particular frame to occupy position which would normally be occupied by bits of a subsequent frame. However, by placing the requirement that all bits of a particular frame whether they be ones or zeros, be present before readout is possible the problems of skewing may be eliminated by this device.

While there have been shown and described and pointed out the fundamental novel features of the invention as applied to the preferred embodiment, it will be understood that various omissions and substitutions and changes of the form and details of the devices illustrated and in its operation may be made by those skilled in the art, without departing from the spirit of the invention.

The embodiments of the invention in which an exclusive property or privilege is claimed are defined as follows:

1. In a device for reading data from a data storage media, a multi-stage asynchronous shift register capable of receiving, storing and transferring data from stage to stage, each stage comprising:
  (*a*) means to store data in a first signal pattern to indicate a first type of data and in a second signal pattern to indicate a second type of data and to provide a third signal pattern to indicate the absence of any stored data;
  (*b*) first means to sense said signal patterns and transfer a first signal over a first signal line if a first signal pattern is stored;
  (*c*) second means to sense said signal pattern and transfer a second signal over a second signal line if a second signal pattern is stored;
  (*d*) and means responsive to the signals stored in a further stage to control the transfer of said first and second signals into said further stage.

2. A device as in claim 1, wherein means are provided to cause said storage means to store said third signal pattern when the transfer of said signals to said further stage is completed.

3. In a device for reading data from a data storage media, a multi-stage asynchronous shift register capable of receiving, storing and transferring data from stage to stage, each stage comprising:
  (*a*) storage means comprising a plurality of logic gate which when operating together store a first signal pattern when data of a first type is received,
  (*b*) store a second signal pattern when data of a second type is received and store a third signal pattern when no data is to be stored therein;
  (*c*) first means responsive to said first signal pattern to produce a first stage output signal;
  (*d*) second means responsive to said second signal pattern to produce a second stage output signal;
  (*e*) means responsive to the absence of further input signals to be stored and to a signal indicative that a further stage is now storing said third signal pattern,
  (*f*) to transfer said first or second output signals to said further stage depending upon the signal pattern stored.

4. A device as claimed in claim 3, wherein means are provided in said further stage to cause said storage means to store said third signal pattern when the transfer to said further stage has been completed.

5. A multi-stage asynchronous shift register wherein information entered into said register is automatically transferred through each successive stage under the control of control signals generated within said asynchronous shift register, each stage comprising:
  (*a*) storage means;
  (*b*) means to enter information into said storage means and prevent read-out of said storage means until the information has been completely entered;
  (*c*) means to sense the information stored in said storage means and provide a signal indicative of the stored information;
  (*d*) means under the control of the next succeeding stage to control the transfer of said signals indicative of said stored information to said next succeeding stage.

6. A register as claimed in claim 5, wherein means are provided in said next succeeding stage to produce a further signal indicative of the completion of the transfer and to cause the storage means of said preceding stage to return to an empty condition.

7. An asynchronous shift register composed of a plurality of stages, each stage comprising:
  (*a*) a storage section coupled to the next preceding stage for receiving information therefrom;
  (*b*) a transfer section coupled to said storage section for providing information signals to the next succeeding stage,
  (*c*) and a control section coupled to said transfer section and the storage section of said next succeeding stage and responsive to said transfer section and the storage section of said next succeeding stage to control the transfer of information to said next succeeding stage.

8. A multi-stage asynchronous shift register wherein information entered into said register is automatically transferred through each successive stage under the control of internally generated signals, each stage comprising:
  (*a*) means to store data in a first signal pattern to indicate a first type of data and in a second signal pattern to indicte a second type of data and to provide a third signal pattern to indicate the absence of any stored data;
  (*b*) transfer means to sense said signal patterns and provide output signals indicative of the type of data stored in said storage means;
  (*c*) connecting means connecting said transfer means to the storage means of the next succeeding stage;
  (*d*) control means responsive to data stored in the storage means of said succeeding stage to cause the transfer means to transfer the data stored in said storage means to the storage means of said next succeeding stage via said connecting means.

9. A register as claimed in claim 8, wherein said control means, further includes means which upon receipt of a signal from said next succeeding stage indicating said transfer is completed produces a signal to cause the storage means to return the signal pattern indicating the absence of stored data.

10. A multi-stage asynchronous shift register wherein information entered into said register is automatically transferred through each successive stage under the control of internally generated signals, each stage comprising:

(a) means to store data in a first signal pattern to indicate a first type of data and in a second signal pattern to indicate a second type of data and to provide a third signal pattern to indicate the absence of any stored data;

(b) a first transfer gate to sense said signal patterns and provide a first output signal when the stored value in said first signal pattern;

(c) a second transfer gate to sense said signal patterns and provide a second output signal when the stored value is said first signal pattern;

(d) a first connecting means connected to said first transfer gate to receive said first output signal;

(e) said first connecting means further connected to the storage means of said next succeeding stage to permit said first output signal to establish said first signal pattern in said storage means of said succeeding stage;

(f) a second connecting means connected to said second transfer gate and to said storage means of said next succeeding stage to receive said second output signal and apply it to said storage means of said next succeeding stage to establish said second signal pattern therein; and (g) control means connected to said first and second transfer gates and responsive to the signal pattern stored in the storage means of said next succeeding stage to control the application of said first and second output signals.

11. A register as claimed in claim 10 wherein an additional control means responsive to the signal pattern stored in the storage means of said next succeeding stage and to said control means to cause said storage means to store said third signal pattern when the transfer of said outputs to the storage means of said next succeeding stage is complete.

12. An asynchronous shift register composed of a plurality of stages, each stage comprising:

(a) a storage section for storing signal patterns indicative of the storage of information of one or the other of two distinct forms, or that said storage section is empty;

(b) a first signal means connected to said storage section to provide an indication of the signal pattern stored in said storage section, said signal indicating whether said storage section may accept for the information;

(c) a transfer section connected to said storage section to provide output signals indicative of the distinct form of the information stored in said storage section to permit the transfer of said stored information to a succeeding stage;

(d) a first control means responsive to an indication from the next succeeding stage, that it can accept information, to provide a signal to said transfer section to cause the transfer to said next succeeding stage the information stored in said storage section; and (e) a second control means responsive to said first control means and to an indication from the next succeeding stage, that it cannot accept information to provide a signal to terminate said transfer to said next succeeding stage and cause the storage section to store a signal pattern indicative that said stage is empty and ready to accept further information from the preceding stage.

13. An asynchronous shift register composed of a plurality of stages, each stage comprising:

(a) a storage section for storing signal patterns indicative of the storage of information of one or the other of two distinct forms, or that said storage section is empty;

(b) a first signal means connected to said storage section to provide an indication of the signal pattern stored in said storage section, said signal indicating whether said storage section may accept further information by providing an information signal of information is stored in said storage section or an empty signal if information is not stored in said storage section;

(c) a transfer section connected to said storage section to provide output signals indicative of the distinct form of the information stored in said storage section;

(d) first connecting means connecting the transfer section of one stage to the storage section of its next succeeding stage to permit the transfer of information from said one stage to said next succeeding stage;

(e) a second connecting means connecting the transfer section of the next preceding stage to the storage section of said one stage to permit the transfer of information from said next preceding stage to said one stage;

(f) each stage further comprising, a first control means responsive to an indication from said next succeeding stage, that it can accept information, to provide a signal to said transfer section to cause the transfer to said next succeeding stage of the information stored in said one stage; and, (g) a second control means responsive to said first control means and to an indication from said next succeeding stage, that it cannot accept information to provide a signal to terminate said transfer to said next succeeding stage and cause the storage section of said one stage to store a signal pattern indicative that said one stage is empty and capable of receiving further information;

(h) said empty signal also being conducted to said first control means of said next preceding stage to permit the transfer of the information stored in said next preceding stage to said one stage via said second connecting means;

(i) whereby said last mentioned transfer of information can only occur after the transfer of information from said one stage to said next succeeding stage has been completed.

14. A multi-stage asynchronous shift register wherein information entered into said register is automatically transferred through each successive stage under the control of internally generated signals, each stage comprising:

(a) means to store data in a first signal pattern to indicate a first type of data and in a second signal pattern to indicate a second type of data and to provide a third signal pattern to indicate the absence of any stored data;

(b) a first signal means connected to said storage section to provide an indication of the signal pattern stored in said storage section, said signal indicating whether said storage section may accept further information by providing an information signal if information is stored in said storage section or an empty signal if information is not stored in said storage section;

(c) a first transfer section connected to said storage section to provide a first output signal indicative of the storage in said storage section of a first type of data;

(d) a second transfer section connected to said storage section to provide a second output signal indicative of the storage in said storage section of a second type of data;

(e) first connecting means connecting said first and second transfer sections of one stage to the storage section of its next succeeding stage to permit the transfer of information from said one stage to said next succeeding stage;

(f) a second connecting means connecting said first and second transfer sections of the next preceding stage to the storage section of said one stage to permit the transfer of information from said next preceding stage to said one stage;

(g) each stage further comprising a first control means responsive to an indication from said next succeeding stage that it stores said third signal pattern, to provide a signal to said first and second transfer sections to cause the transfer to said next succeeding stage of the information stored in said one stage; and, (h) a second control means responsive to said first control means and to an indication from said next succeeding stage that it now stores said first or said second data signal patterns, to provide a signal to terminate said transfer to said next succeeding stage and cause the storage section of said one stage to store said third signal pattern indicative that said one stage is empty and capable of receiving further information;

(i) said empty signal also being conducted to said first control means of said next preceding stage to permit the transfer of the information stored in said next preceding stage to said one stage via said second connecting means;

(j) whereby said last mentioned transfer of information can only occur after the transfer of information from said one stage to said next succeeding stage has been completed.

References Cited in the file of this patent

UNITED STATES PATENTS 2,922,985 Crawford -------------- Jan. 26, 1960

OTHER REFERENCES

"Asynchronous Computer Control," IBM Tech Disclosure Bulletin, vol. 4, No. 9, February 1962, pages 28–30.